(12) United States Patent
Huffman et al.

(10) Patent No.: US 7,849,111 B2
(45) Date of Patent: Dec. 7, 2010

(54) ONLINE INCREMENTAL DATABASE DUMP

(75) Inventors: Bill Huffman, San Diego, CA (US); Donald Pederson, San Diego, CA (US); May Pederson, San Diego, CA (US); Richard Pogue, San Diego, CA (US)

(73) Assignee: Teradata US, Inc., Miamisburg, OH (US)

( * ) Notice: Subject to any disclaimer, the term of this patent is extended or adjusted under 35 U.S.C. 154(b) by 329 days.

(21) Appl. No.: 11/967,711

(22) Filed: Dec. 31, 2007

(65) Prior Publication Data
US 2009/0172051 A1 Jul. 2, 2009

(51) Int. Cl.
G06F 17/30 (2006.01)
(52) U.S. Cl. ...................................... 707/813
(58) Field of Classification Search ............. 707/3, 707/5, 8, 202, 203, 813
See application file for complete search history.

(56) References Cited
U.S. PATENT DOCUMENTS

| | | | |
|---|---|---|---|
| 6,772,155 B1 * | 8/2004 | Stegelmann | 707/8 |
| 7,107,418 B2 | 9/2006 | Ohran | |
| 7,155,465 B2 | 12/2006 | Lee et al. | |
| 2006/0161528 A1 * | 7/2006 | Dettinger et al. | 707/3 |
| 2006/0259721 A1 | 11/2006 | Ohran | |
| 2007/0033181 A1 * | 2/2007 | Barsness et al. | 707/5 |
| 2007/0112883 A1 * | 5/2007 | Asano et al. | 707/202 |
| 2007/0299890 A1 | 12/2007 | Boomer | |
| 2008/0040402 A1 * | 2/2008 | Judd | 707/203 |

* cited by examiner

*Primary Examiner*—Etienne P LeRoux
(74) *Attorney, Agent, or Firm*—Schwegman, Lundberg & Woessner, P.A.

(57) ABSTRACT

Various embodiments may include taking an initial dump of a database table and tracking changes to the database table, with regard to but outside of transactions, since a most recent full or partial dump has been taken. A partial dump, in such embodiments, may be taken since the most recent full or partial dump and used to create a data structure which may be used to update only those database table rows modified since a last full or partial dump. As a result, the dumps of a database table will include a single full dump and may include one or more partial dumps. These full and partial dumps may then be instantiated to create or update an instance of the database table. In some embodiments, dumps may be taken directly to a mirrored instance of a database table.

18 Claims, 4 Drawing Sheets

ONLINE INCREMENTAL DATABASE DUMP

BACKGROUND INFORMATION

Backing up or otherwise taking copies of data stored in databases is generally a time and resource consuming process. Many of such processes take copies of an entire database or entire database tables which are then processed as a whole to replicate the database or tables during disaster recovery or data warehousing or when generating other reporting, development, or testing instances of a database or table thereof. Such processes often lock data preventing other processes from executing until the locks are released.

DETAILED DESCRIPTION

Figure 1:
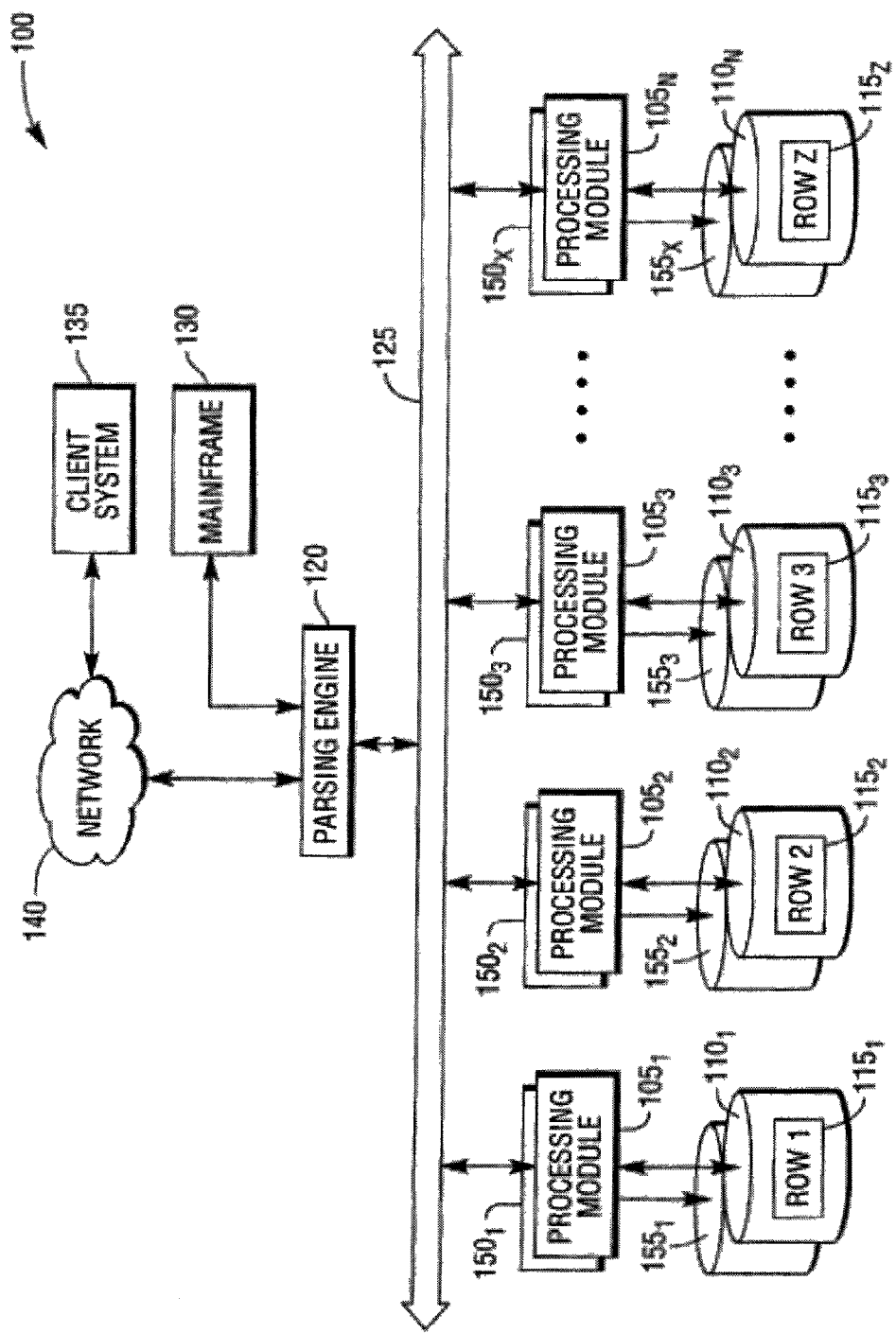
FIG. 1 shows an example of a database system according to an example embodiment.

The various embodiments described herein include solutions that may be used to reduce the time and resources necessary to take dumps of databases and tables therein and replicate such databases or tables. Some such embodiments include taking an initial dump of a database table and tracking changes to the database table, with regard to but outside of transactions, since a most recent full or partial dump has been taken. A partial dump, in such embodiments, may be taken since the most recent full or partial dump and used to create a data structure that may be used to update only those database table rows modified since a last full or partial dump. As a result, the dumps of a database table will include a single full dump and may include one or more partial dumps. These full and partial dumps may then be instantiated in ascending order, from earliest to most recent, to create or update an instance of the database table. These and other embodiments are described in greater detail herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 shows an example of a database system 100, such as a Teradata active data warehousing system available from Teradata Corporation, according to an example embodiment. Database system 100 is an example of one type of computer system in which the techniques of handling a restore and archive process for an on-line archive are implemented. In computer system 100, vast amounts of data are stored on many disk-storage facilities that are managed by many processing units. In this example, the data warehouse 100 includes a relational database management system (RDBMS) built upon a massively parallel processing (MPP) platform.

Other types of database systems, such as object-relational database management systems (ORDMS) or those built on symmetric multi-processing (SMP) platforms are also suited for use here.

The data warehouse 100 includes one or more processing modules $105_{1 \ldots N}$ that manage the storage and retrieval of data in data-storage facilities $110_{1 \ldots N}$. The rows $115_{1 \ldots Z}$ of the tables are stored across multiple data-storage facilities $110_{1 \ldots N}$ to ensure that the system workload is distributed evenly across the processing modules $105_{1 \ldots N}$. A parsing engine 120 organizes the storage of data and the distribution of table rows $115_{1 \ldots Z}$ among the processing modules $105_{1 \ldots N}$. The parsing engine 120 also coordinates the retrieval of data from the data-storage facilities $110_{1 \ldots N}$ over network 125 in response to queries received from a user at a mainframe 130 or a client computer 135 connected to a network 140. The database system 100 usually receives queries and commands to build tables in a standard format, such as SQL.

In one implementation the rows $115_{1 \ldots Z}$ are distributed across the data-storage facilities $110_{1 \ldots N}$ by the parsing engine 120 in accordance with their primary index. The primary index defines the columns of the rows that are used for calculating a hash value. The function that produces the hash value from the values in the columns specified by a primary index (in Teradata terminology) is called a hash function.

It is often necessary to archive rows 115 of the table. In the case of hardware failure, a database system manager needs to remove the faulty hardware, replace the hardware and restore the data onto the new hardware from the latest archived copy. It is also helpful for a database developer to conduct testing on data for various reasons. It is helpful to have an archive of the table data so that any changes arising from the testing in the main or primary copy of the data can be restored by the archived copy, or alternatively a complete copy of the archived copy can be made and testing performed on that copy of the archived copy.

Shown in FIG. 1 is a further set of processing modules $150_{1 \ldots X}$. Processing modules $150_{1 \ldots X}$ manage the storage and retrieval of data in data-storage facilities $155_{1 \ldots X}$. It is data-storage facilities $155_{1 \ldots X}$ on which the on-line archive of table rows $115_{1...Z}$ is stored. However, in other embodiments, archives may be stored as one or more files or other data structures within which table rows are represented and from which the table rows may be instantiated.

Figure 2:
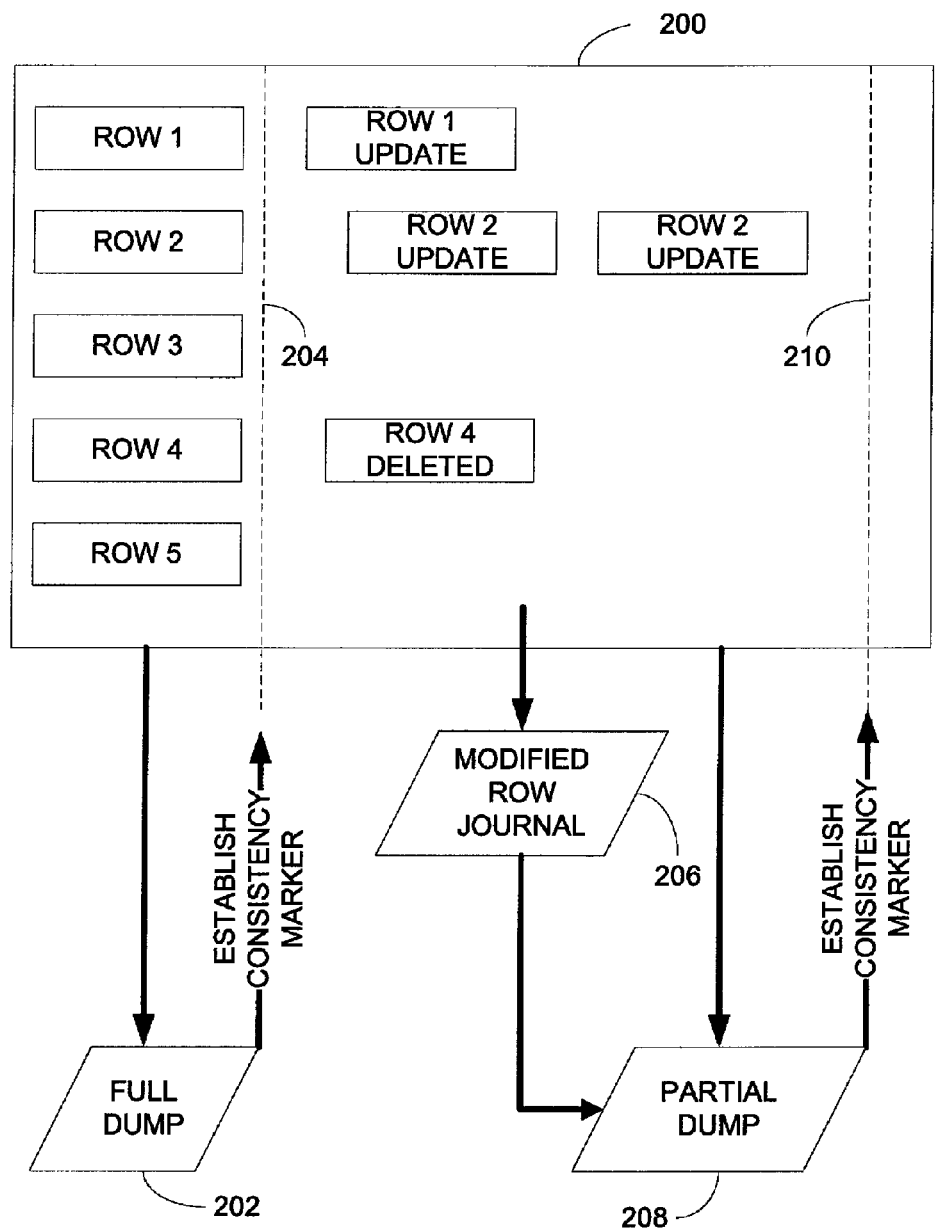
FIG. 2 illustrates full and partial dump processes according to an example embodiment.

FIG. 2 illustrates full and partial dump processes according to an example embodiment. The example embodiment includes a database table 200 for which an online archive process is active. The database table 200 includes rows of data, such as ROW 1, ROW 2, ROW 3, ROW 4, and ROW 5. Although only five rows are illustrated, more rows or fewer rows may be present in the database table 200. When an online archive process is first associated with the database table 200, after a certain volume of changes to the database table 200, or on a periodic basis, depending on the embodiment, a full dump 202 is taken of the database table 200. A full dump typically includes copying all rows from the database table 200 into a file or a mirrored, or otherwise similar instance of the database table 200. Following the full dump, a consistency marker 204 is established indicating when the full dump was taken.

Subsequent to the full dump 202, rows of the database table 200 may be modified. For example, ROW 1 is updated, ROW 2 is updated twice, and ROW 4 is deleted. In typical embodiments, the row modifications are tracked. In some embodiments, the tracking of the modified rows is performed after transactions within which the rows are modified are committed to the database table. Thus, the tracking is performed outside of transactions and does not add time consuming overhead to the transactions. These modifications are tracked, in some embodiments, within a garbage collector process of a database management system that operates to remove data from memory after database transactions have ceased. This data typically includes at least an identifier of each row that has been modified and the disposition of the transaction such as committed and rolled back. In the event that this process identifies modified rows within a transaction that has been committed, the process writes an identifier of each modified row to a modified row journal 206. The garbage collector, or other similar process, may then continue with its cleanup tasks.

In some embodiments, the modified row journal 206 may be a child table of the database table 200. The modified row journal 206 may also be a location where the consistency marker 204 and a consistency marker 210, which is described below, are written and stored.

A partial dump process may then operate as a function of the modified row journal 206 to identify rows that have been modified since a last full or partial dump. In the present embodiment, the modified row journal 206 include entries after the last consistency marker 204 indicating that ROW 1 has been updated, ROW 2 has been updated twice, and ROW 4 has been deleted. In some embodiments, the partial dump process will create a partial dump file 208, also referred to as a table modification data structure, as a function of the rows identified in the modified row journal 206 since the last consistency marker 204. The partial dump process in some such embodiments eliminates duplicates from the modified row journal to include only a single entry for each modified row.

The partial dump process may then copy rows from the database table 200 into the partial dump file 208 or the mirrored or otherwise similar instance of the database table 200, mentioned above. The rows copied include only those rows modified since the last consistency marker. Note however that ROW 4 was deleted from the database table 200. In such an instance, when trying to retrieve the row form the database table 200, an error will be received. This error causes the partial dump process to include data representative of the row, but also includes an indicator that the row has been deleted. Such an indicator may include an identifier of the row and no further data of the row. Such an indicator may then be read by a process tasked with instantiating an instance of the database table 200 or updating an archive of the database table 200 and understood that the row is to be deleted in that instance.

Once the partial dump file 208 is populated with data of the modified rows, another consistency marker 210 is established. Further modifications may be made to the database table 200, which will be tracked. The partial dump process will execute again with regard to the new consistency marker 210.

Note that more than one pair of full and partial dump processes may exist with regard to a single database table 200. For example, a daily dump process may exist concurrently with one or more of weekly, monthly, and quarterly dump processes. To facilitate multiple dumps, the consistency markers may identify the dump process to which they belong. Thus, there may be many consistency markers present for each of several dump processes. Such dump processes ignore consistency markers that are established by other dump processes.

Figure 3:
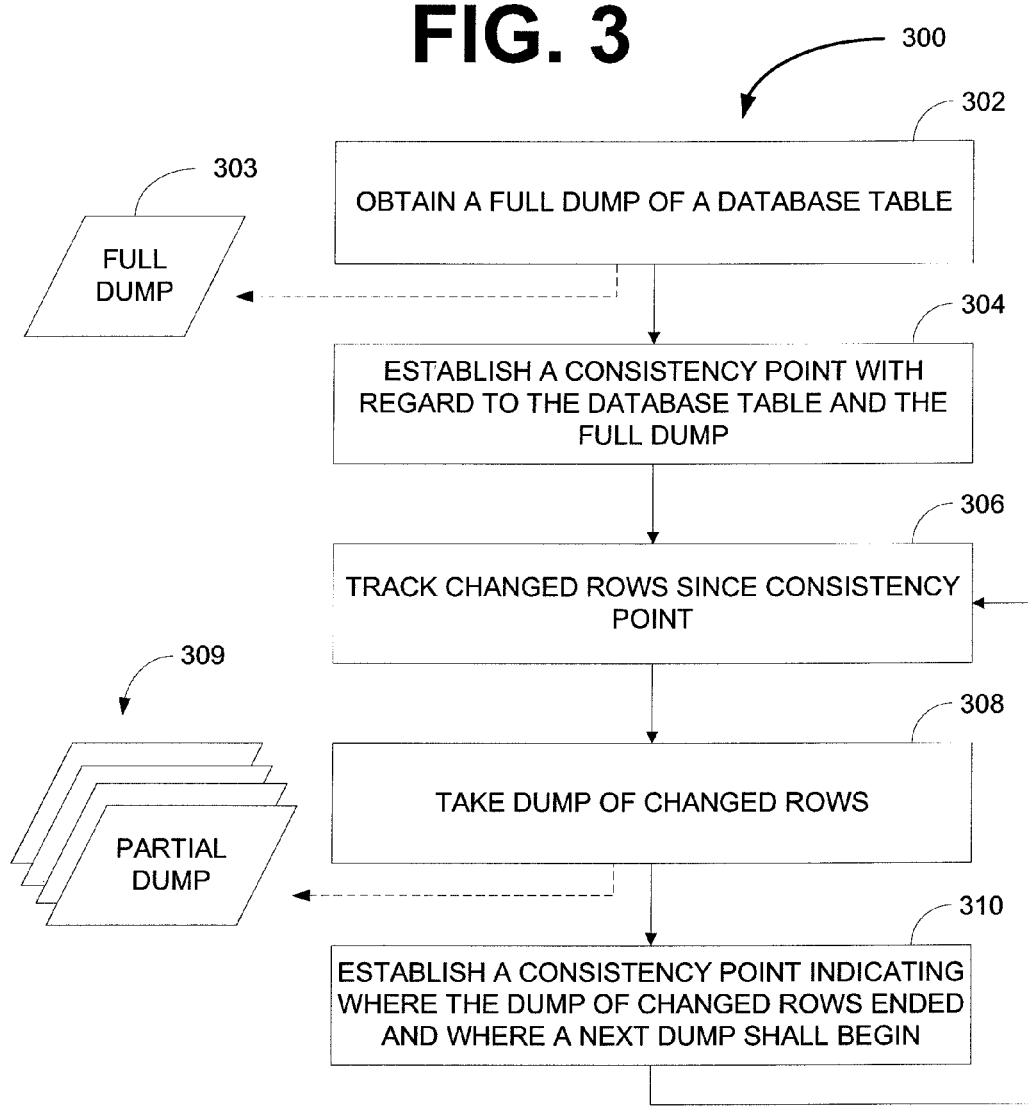
FIG. 3 illustrates a method according to an example embodiment.

FIG. 3 illustrates a method 300 according to an example embodiment. The method 300 includes obtaining 302 a full dump 303 of a database table and establishing 204 a consistency point, which may also be referred to as a marker, with regard to the database table and the full dump 303. The method 300 further includes tracking 306 changed rows since the consistency point and taking 308 a dump of the changed rows into a partial dump file 309. The method 300 then establishes 310 another consistency point indicating where the dump of changed rows ended and where a next partial dump shall begin. The method 300 then continues to track 306 changed rows since the latest consistency point and takes 308 partial dumps 309 and establishes 310 further consistency points. The method 300 repeats in this fashion.

The full dump file 303 and one or more partial dump files 309 may be used to instantiate an instance of a monitored database table. Such an instance may be instantiated by first copying the full dump file 303 to a suitably configured database table and then sequentially instantiating the partial dump files 309 from an earliest file to a most recent until the data is in a desired state.

Figure 4:
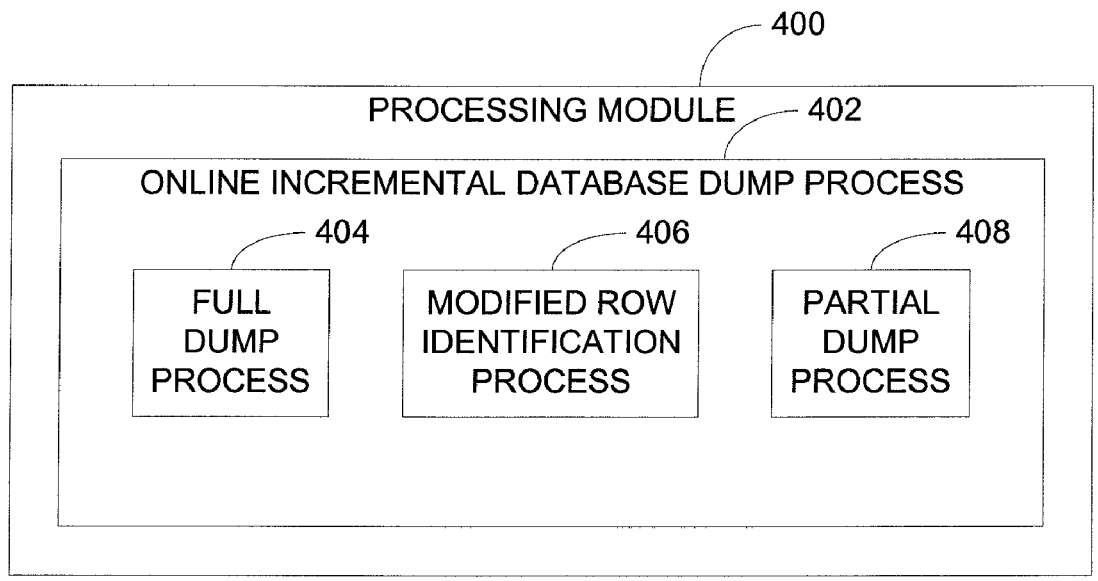
FIG. 4 is a block diagram of a portion of a system according to an example embodiment.

FIG. 4 is a block diagram of a portion of a system according to an example embodiment. In some embodiments, the system includes a processing module 400, which may be the same or similar to one or more of the processing modules $150_{1...X}$ illustrated and described above with regard to FIG. 1. In other embodiments, the processing module 400 may be a portion of a database management system or an add-on module to a database management system. The processing module 400 includes an online incremental database dump process 402. The online incremental database dump process 402 includes a full dump process 404, a modified row identification process 406, and a partial dump process 408. The full dump process 404 is typically operable to generate a backup copy of a database table and to insert a marker in a modified row journal of the database table. The a modified row identification process 406 is typically operable to insert an identifier of a modified row in a modified row journal of the database table after one or more transactions have successfully committed one or more modifications to one or more rows in the database table. In some embodiments, the modified row identification process 406 is operable to insert the identifier of a modified row when a row is created, updated, or deleted. The modified row identification process 406, in some embodiments, is operable prior to or as part of a garbage collection process that operates to remove journaling data associated with transactions that have committed, rolled back, timed out, or have otherwise terminated.

The a partial dump process 408 is typically operable to create a data structure including current values of rows included in the modified row journal after a most recent marker in the modified row journal and to insert a marker in the modified row journal indicating the data structure has been created.

In some embodiments, the full dump process 404 and the partial dump process 408 may be operable to insert markers to the modified row journal identifying a respective dump process target, such as one of one or more periodic dump processes or special purpose dump processes which may include an identifier of a development or testing database region.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   creating a backup copy of a database table;
   inserting a marker in a modified row journal of the database table;
   within a database management system garbage collector process before the garbage collector process purges journaling data associated with transactions that have committed, rolled back, timed out, or have otherwise terminated:
      identifying modified rows in the database table, and
      writing a row id of each modified row to the modified row journal.

2. The method of claim 1, further comprising:
   reading into a modified row listing the row ids starting at a first row in the modified row journal following a most recent marker in the modified row journal;
   copying the modified rows identified in the modified row listing from the database table into a table modification data structure; and
   inserting a marker in the modified row journal of the database table.

3. The method of claim 2, wherein before the copying of the modified rows from the database table into the table modification data structure is performed, the method includes:
   identifying duplicate row ids in the modified row listing and removing all but one of the duplicate row ids.

4. The method of claim 2, wherein if a row id does not exist in the database table, the row id is written to the table modification data structure to signify that the row has been deleted from database table.

5. The method of claim 2, further comprising:
   creating a second instance of the database table;
   copying data from the backup copy to the second instance of the database table; and
   updating rows in the second instance of the database table as a function of the table modification data structure.

6. The method of claim 5, further comprising:
   further updating rows in the second instance of the database table as a function of a second table modification data structure including only data of rows identified in the modified row journal as modified since a latest marker in the modified row journal.

7. A database management system comprising:
   a full dump process operable to generate a backup copy of a database table and to insert a marker in a modified row journal of the database table;
   a modified row identification process operable to insert an identifier of a modified row in a modified row journal of the database table after one or more transactions have successfully committed one or more modifications to one or more rows in the database table; and
   a partial dump process operable to:
      create a data structure including current values of rows included in the modified row journal after a most recent marker in the modified row journal, and
      insert a marker in the modified row journal indicating the data structure has been created.

8. The database management system of claim 7, wherein the modified row identification process is operable to insert the identifier of a modified row when a row is created, updated, or deleted.

9. The database management system of claim 7, wherein the modified row identification process is operable prior to or as part of a garbage collection process that operates to remove journaling data associated with transactions that have committed, rolled back, timed out, or have otherwise terminated.

10. The database management system of claim 7, wherein the full dump process and the partial dump process are operable to insert markers to the modified row journal identifying a respective dump process target.

11. The database management system of claim 10, wherein a dump process target is an identifier of a period for which the respective full or partial dump covers.

12. The database management system of claim 10, wherein there are two or more dump process targets.

13. A computer-readable medium, within instructions thereon, which when executed, cause one or more computing devices to perform a method comprising:
   creating a backup copy of a database table;
   inserting a marker in a modified row journal of the database table;
   within a database management system transient journal garbage collector process before the garbage collector process purges a transient journal journaling data associated with transactions that have committed, rolled back, timed out, or have otherwise terminated:
      identifying modified rows in the database table, and
      writing a row id of each modified row to the modified row journal.

14. The computer-readable medium of claim 13, with further instructions of the method, which when executed, cause the one or more computing devices to:

read into a modified row listing the row ids starting at a first row in the modified row journal following a most recent marker in the modified row journal;
copy the modified rows identified in the modified row listing from the database table into a table modification data structure; and
insert a marker in the modified row journal of the database table.

15. The computer-readable medium of claim 14, wherein before the copying of the modified rows from the database table into the table modification data structure is performed, the instructions are further operable to:
identify duplicate row ids in the modified row listing and removing all but one of the duplicate row ids.

16. The computer-readable medium of claim 14, wherein if a row id does not exist in the database table, the row id is written to the table modification data structure to signify that the row has been deleted from database table.

17. The computer-readable medium of claim 14, with further instructions of the method, which when executed, cause the one or more computing devices to:
create a second instance of the database table;
copy data from the backup copy to the second instance of the database table; and
updating rows in the second instance of the database table as a function of the table modification data structure.

18. The computer-readable medium of claim 17, with further instructions of the method, which when executed, cause the one or more computing devices to:
further update rows in the second instance of the database table as a function of a second table modification data structure including only data of rows identified in the modified row journal as modified since a latest marker in the modified row journal.

* * * * *